US012132983B2

(12) United States Patent
Shroff et al.

(10) Patent No.: US 12,132,983 B2
(45) Date of Patent: Oct. 29, 2024

(54) USER INTERFACE TO SELECT FIELD OF VIEW OF A CAMERA IN A SMART GLASS

(71) Applicant: Meta Platforms Technologies, LLC, Menlo Park, CA (US)

(72) Inventors: Sapna Shroff, Burlingame, CA (US); Sebastian Sztuk, Menlo Park, CA (US); Jun Hu, San Jose, CA (US); Johana Gabriela Coyoc Escudero, Union City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 35 days.

(21) Appl. No.: 17/859,808

(22) Filed: Jul. 7, 2022

(65) Prior Publication Data
US 2023/0032467 A1 Feb. 2, 2023

Related U.S. Application Data

(60) Provisional application No. 63/227,231, filed on Jul. 29, 2021, provisional application No. 63/227,238, (Continued)

(51) Int. Cl.
*H04N 23/60* (2023.01)
*G02B 27/01* (2006.01)
(Continued)

(52) U.S. Cl.
CPC ......... *H04N 23/64* (2023.01); *G02B 27/0172* (2013.01); *G02C 7/101* (2013.01); *G02C 7/16* (2013.01); *G06F 3/013* (2013.01); *G06F 3/016* (2013.01); *G06F 3/017* (2013.01); *G06F 3/044* (2013.01); *G06F 3/167* (2013.01); *G06F 40/205* (2020.01); *G06V 10/25* (2022.01);
(Continued)

(58) Field of Classification Search
CPC .............................. H04N 23/64; G06V 10/759
See application file for complete search history.

(56) References Cited

U.S. PATENT DOCUMENTS 6,972,771 B2   12/2005   Nakano et al.
9,179,061 B1*  11/2015   Kraft .................... G06V 30/224
(Continued)

OTHER PUBLICATIONS

EPO—International Search Report and Written Opinion for International Application No. PCT/US2022/038849, mailed Nov. 9, 2022, 10 pages.
(Continued)

*Primary Examiner* — Irfan Habib
(74) *Attorney, Agent, or Firm* — McDermott Will & Emery LLP

(57) ABSTRACT

A wearable device for use in immersive reality applications is provided. The wearable device includes eyepieces to provide a forward-image to a user, a first forward-looking camera mounted on the frame and having a field of view, a processor configured to identify a region of interest within the forward-image, and an interface device to indicate to the user that a field of view of the first forward-looking camera is misaligned with the region of interest. Methods of use of the device, a memory storing instructions and a processor to execute the instructions to cause the device to perform the methods of use, are also provided.

20 Claims, 13 Drawing Sheets

Related U.S. Application Data filed on Jul. 29, 2021, provisional application No. 63/227,240, filed on Jul. 29, 2021.

(51) Int. Cl.
| | |
|---|---|
| *G02C 7/10* | (2006.01) |
| *G02C 7/16* | (2006.01) |
| *G06F 3/01* | (2006.01) |
| *G06F 3/044* | (2006.01) |
| *G06F 3/16* | (2006.01) |
| *G06F 40/205* | (2020.01) |
| *G06V 10/25* | (2022.01) |
| *G06V 10/75* | (2022.01) |
| *G06V 20/50* | (2022.01) |
| *G10L 17/06* | (2013.01) |
| *G10L 17/22* | (2013.01) |
| *H04N 23/56* | (2023.01) |
| *H04N 23/62* | (2023.01) |
| *H04N 23/63* | (2023.01) |
| *H04N 23/66* | (2023.01) |
| *H04N 23/695* | (2023.01) |
| *H04N 23/90* | (2023.01) |

(52) U.S. Cl.
CPC ............ *G06V 10/759* (2022.01); *G06V 20/50* (2022.01); *G10L 17/06* (2013.01); *G10L 17/22* (2013.01); *H04N 23/56* (2023.01); *H04N 23/62* (2023.01); *H04N 23/63* (2023.01); *H04N 23/66* (2023.01); *H04N 23/695* (2023.01); *H04N 23/90* (2023.01); *G02B 2027/0138* (2013.01); *G02B 2027/0141* (2013.01); *G02B 2027/0178* (2013.01)

(56) References Cited

U.S. PATENT DOCUMENTS

| | | | |
|---|---|---|---|
| 10,012,506 B1 * | 7/2018 | Monahan | G01C 21/20 |
| 10,667,981 B2 | 6/2020 | Osterhout et al. | |
| 10,849,817 B2 | 12/2020 | Border | |
| 11,047,693 B1 * | 6/2021 | Schaefer | G06F 3/016 |
| 11,128,636 B1 * | 9/2021 | Jorasch | G07C 9/257 |
| 11,520,399 B2 | 12/2022 | Kang et al. | |
| 11,531,402 B1 | 12/2022 | Stolzenberg | |
| 11,546,505 B2 | 1/2023 | Canberk | |
| 11,556,220 B1 | 1/2023 | Inch et al. | |
| 11,609,625 B2 | 3/2023 | Johnson et al. | |
| 11,625,103 B2 | 4/2023 | Schoen | |
| 11,636,655 B2 | 4/2023 | Ma et al. | |
| 11,637,999 B1 | 4/2023 | Tichenor et al. | |
| 11,651,573 B2 | 5/2023 | Tichenor et al. | |
| 2008/0036875 A1 | 2/2008 | Jones et al. | |
| 2012/0242698 A1 | 9/2012 | Haddick et al. | |
| 2013/0187786 A1 * | 7/2013 | Dadlani Mahtani | A63B 71/0622 340/691.8 |
| 2013/0222235 A1 * | 8/2013 | Abdollahi | G06F 3/013 345/156 |
| 2013/0257899 A1 | 10/2013 | Baron et al. | |
| 2014/0062962 A1 | 3/2014 | Jang et al. | |
| 2014/0198055 A1 | 7/2014 | Barkway | |
| 2014/0223647 A1 * | 8/2014 | Long | A61F 9/029 2/452 |
| 2014/0361971 A1 | 12/2014 | Sala | |
| 2015/0025794 A1 * | 1/2015 | Long | G01C 21/20 2/442 |
| 2015/0177514 A1 | 6/2015 | Maimone et al. | |
| 2015/0310657 A1 * | 10/2015 | Eden | G06Q 30/0273 345/441 |
| 2016/0080874 A1 * | 3/2016 | Fullam | G06F 3/013 381/313 |
| 2017/0122771 A1 | 5/2017 | Keal et al. | |
| 2018/0074600 A1 * | 3/2018 | Park | G01S 13/42 |
| 2018/0081178 A1 | 3/2018 | Shpunt | |
| 2018/0157045 A1 * | 6/2018 | Davami | G02B 27/0172 |
| 2019/0011703 A1 | 1/2019 | Robaina et al. | |
| 2019/0371075 A1 | 12/2019 | Stafford et al. | |
| 2019/0377416 A1 | 12/2019 | Alexander | |
| 2020/0034617 A1 * | 1/2020 | Croxford | G06V 20/10 |
| 2021/0081047 A1 * | 3/2021 | Wang | G06F 3/012 |
| 2021/0191127 A1 | 6/2021 | Haddick et al. | |
| 2021/0304509 A1 * | 9/2021 | Berkebile | G06F 3/04815 |
| 2021/0390882 A1 * | 12/2021 | Iyengar | G06T 7/60 |
| 2023/0316698 A1 * | 10/2023 | Agrawal | G06V 10/255 382/103 |

OTHER PUBLICATIONS

EPO—International Search report and Written Opinion for International Application No. PCT/US2022/038933, mailed Nov. 16, 2022, 10 pages.

* cited by examiner

USER INTERFACE TO SELECT FIELD OF VIEW OF A CAMERA IN A SMART GLASS

CROSS-REFERENCE TO RELATED APPLICATIONS

The present disclosure is related and claims priority under 35 USC. § 119(e) to U.S. Prov. Pat. Appln. No. 63/227,231, entitled SMART GLASS DEVICES WITH REGION OF INTEREST DETECTION USING EYE TRACKING, to U.S. Prov. Pat. Appln. No. 63/227,238, entitled SMART GLASS DEVICES WITH GESTURE BASED REGION OF INTEREST DETECTION, and to U.S. Prov. Pat. Appln. No. 63/227,240, entitled SMART GLASS DEVICES WITH REGION OF INTEREST CORRECTION VIA PARTIAL GLASS SHADING, filed on Jul. 29, 2021, to Sapna SHROFF et-al., the contents of which applications are hereby incorporated herein by reference in their entirety, for all purposes.

BACKGROUND

Field

The present disclosure is related to user interfaces in smart glass devices that include one or more cameras for recording images and video. More specifically, the present disclosure is related to methods for identifying a region of interest in a user field of view using eye tracking tools and providing non-invasive feedback to the user to make the user's region of interest consistent with the field of view of the one or more cameras in the smart glasses.

Related Art

Many electronic appliances today include, embedded within a wearable framework, one or more cameras that the user may activate to collect pictures or videos. However, in many cases, the user collects images and videos that do not match the region of interest of the user's field of view at the time of collection. This happens because the angle and field of view of the one or more cameras is generally not the same as that of the user. In certain types of electronic appliances, this inconsistency may be cured by providing direct feedback to the user, on a display, of the field of view of the one or more camera accessories. The user can then manually modify camera position and optical configuration (magnification, aperture size, and the like) to make it consistent with a region of interest. However, this approach requires the use of a display, which may not be available in some appliances, and the focused attention of the user to correct the inconsistencies. In some appliances having a display, it may still be desirable to use the real estate therein for maximizing user enjoyment rather than for hardware adjustments.

Figure 1:
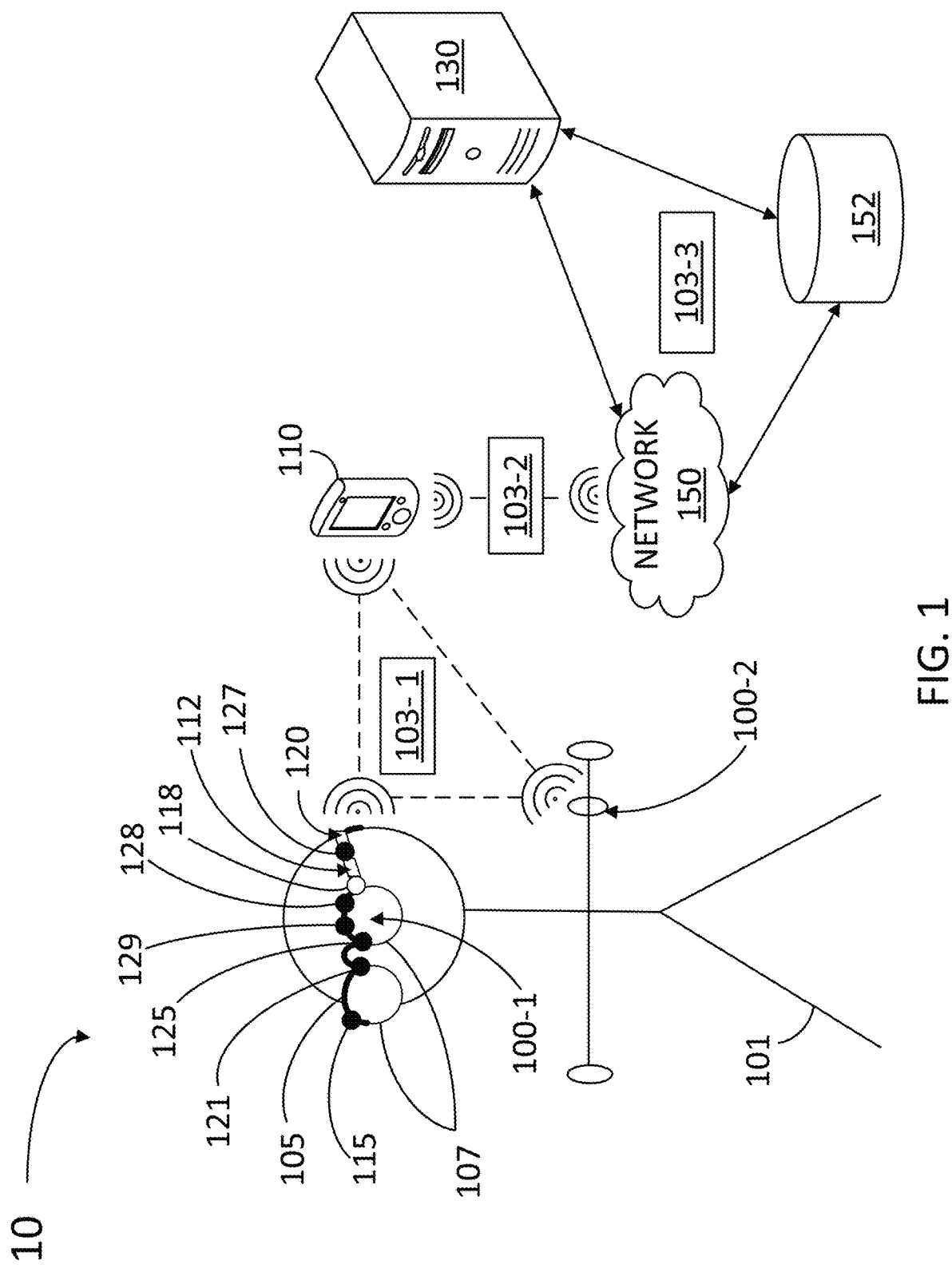
FIG. 1 illustrates an architecture including one or more wearable devices coupled to one another, to a mobile device, a remote server and to a database, according to some embodiments.

In the figures, elements having the same or similar label number share the same or similar features, unless stated explicitly otherwise.

SUMMARY

In a first embodiment, a device includes: a frame including an eyepiece to provide a forward-image to a user, a first forward-looking camera mounted on the frame; a processor configured to identify a region of interest within the field of view of the user, and an interface device to indicate to the user that the field of view of the first forward-looking camera is misaligned with the region of interest.

In a second embodiment, a computer-implemented method includes: receiving from a user of a smart glass, an indication of an object of interest within a forward-image viewed by the user, comparing a region of interest centered on the object of interest with a field of view of a first forward-looking camera mounted on a frame of the smart glass, and providing, via an interface actuator mounted on the smart glass, a feedback to the user based on a relative position between the region of interest and the field of view of the first forward-looking camera.

In a third embodiment, a computer-implemented method for a camera interface in a smart glass includes identifying a mismatch between a region of interest centered in an object of interest for the user and the field of view of a first camera mounted on the smart glass. The computer-implemented method includes automatically updating a position, direction or other setting of the first camera, or selecting a second camera on the smart glass that is better positioned relative to the region of interest, without notifying the user.

In another embodiment, a system includes one or more processors and a memory storing instructions which, when executed by the one or more processors, cause the system to perform a method. The method includes receiving from a user of a smart glass, an indication of an object of interest within a field of view of the user, comparing a region of interest centered on the object of interest with a field of view of a first forward-looking camera mounted on a frame of the smart glass, and providing, via an interface actuator mounted on the smart glass, a feedback to the user based on a relative position between the region of interest and the field of view of the first forward-looking camera, the feedback intended to have the user adjust a head position relative to the object of interest.

In yet another embodiment, a system includes a first means to store instructions, and a second means to execute the instructions and cause the system to perform a method.

The method includes receiving from a user of a smart glass, an indication of an object of interest within a field of view of the user, comparing a region of interest centered on the object of interest with a field of view of a first forward-looking camera mounted on a frame of the smart glass, and providing, via an interface actuator mounted on the smart glass, a feedback to the user based on a relative position between the region of interest and the field of view of the first forward-looking camera.

These and other embodiments will be clear based on the following disclosure.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in the figures herein, as follows.

Traditional camera or imaging systems allow the user to view the subject or scene being captured from the perspective of the camera. Some approaches include viewfinders, eyepieces, displays with preview, and live stream. However, a system where the camera does not have a viewfinder, display, or other such means to see the subject or scene being captured from the perspective of the camera, presents an undesirable uncertainty to the user about the camera field of view. While it is possible to trigger shots taken by the camera, the exact scene or perspective being captured may be unknown to the user at the moment of capture when there is no feedback to correct the camera field of view before triggering capture.

To resolve the above problems arising in the technical field of wearable devices with video camera accessories, embodiments as disclosed herein allow a user to get a sense of the field of view that would be covered by the camera. In some embodiments, a system includes a smart glass with a built-in or attached camera. The system may or may not have a display for the user. If a display exists, it may be unavailable for the camera field of view, or it may be preferably devoted for other utilities.

In addition, to resolve the above problems arising in the technical field of wearable devices (e.g., a "smart glass") with video camera accessories, embodiments as disclosed herein allow a user to get a sense of the field of view that would be covered by the camera. In some embodiments, a system includes a smart glass with a built-in or attached camera.

A smart glass device as disclosed herein includes a frame including eyepieces to provide a field of view to a user, a forward-looking camera mounted on the frame, a sensing device facing the user for tracking a pupil position of the user, a processing circuit configured to identify a region of interest (ROI) within the field of view of the user, and an interface device to indicate to the user that a field of view of the forward-looking camera is misaligned with the region of interest. In some embodiments, a memory may store instructions which, when executed by the processor, cause the smart glass to perform one or more steps in a method consistent with the present disclosure. The memory may also store data, such as calibration data for the position and orientation of the forward-looking camera relative to the user field of view.

Embodiments as disclosed herein use eye tracking tools to identify a region of interest in a scene viewed through a smart glass as disclosed above. In addition, embodiments as disclosed herein read user gesture to identify a region of interest in a scene viewed through a smart glass as disclosed above. In some embodiments, a system is designed such that the camera captures the scene, including some example hand gestures from the user. The frames including hand gestures are run through a gesture recognition system to recognize the moment when the appropriate gesture is presented by the user, and identify the region of interest based on a reading of the hand gesture from the user.

FIG. 1 illustrates an architecture 10 including one or more wearable devices 100-1 (e.g., a smart glass) and 100-2 (e.g., a smart watch) coupled to one another (hereinafter, collectively referred to as "wearable devices 100"), to a mobile device 110, a remote server 130, and to a database 152, according to some embodiments. Smart glass 100-1 may be configured for AR/VR applications, and mobile device 110 may be a smart phone, all of which may communicate with one another via wireless communications and exchange a first dataset 103-1. Dataset 103-1 may include a recorded video, audio, or some other file or streaming media. A user 101 of wearable devices 100 is also the owner or is associated with mobile device 110. In some embodiments, the smart glass may directly communicate with the remote server, the database, or any other client device (e.g., a smart phone of a different user, and the like) via the network. The mobile device may be communicatively coupled with a remote server and a database via a network 150, and transmit/share information, files, and the like with one another, e.g., dataset 103-2 and dataset 103-3 (hereinafter, collectively referred to as "datasets 103"). Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

Smart glass 100-1 may include a frame 105 including eyepieces 107 to provide a forward-image to user 101. A camera 115 (e.g., forward-looking) is mounted on frame 105. A sensing device 128 facing the user is configured to track a pupil position of the user. Processor 112 is configured to identify a region of interest (ROI) of user 101. An interface device 129 indicates to user 101 that an FOV of camera 115 is misaligned with the ROI. In some embodiments, smart glass 100-1 may automatically identify a misalignment between the ROI and the FOV of camera 115 by applying algorithms such as object recognition or scene understanding. In the case of a static offset between the FOV of camera 115 and the ROI, a user calibration may be implemented to apply a strain gauge in the display for the user. In some embodiments, smart glass 100-1 may also include a haptic actuator 125 to recreate a sense of touch to the user, for a VR/AR application, and a speaker 127 to communicate to user 101 voice or sound signals indicative of adjusting a gaze direction for improving the FOV of camera 115. For example, in some embodiments, haptic actuator 125 may include a vibrating component to indicate to the user to nudge their head position in a desired direction to align the FOV of forward-looking camera 115 with the ROI (e.g., apply a vibration on the left temple of the user to shift the user gaze slightly to the left, and so forth).

In some embodiments, smart glass 100-1 may include multiple sensors 121 such as IMUs, gyroscopes, microphones, and capacitive sensors configured as touch interfaces for the user. Other touch sensors may include a pressure sensor, a thermometer, and the like.

In addition, wearable devices 100, or mobile device 110, may include a memory circuit 120 storing instructions, and a processor circuit 112 configured to execute the instructions to cause smart glass 100-1 to perform, at least partially, some of the steps in methods consistent with the present disclosure. Memory circuit 120 may also store data, such as calibration data for the position and orientation of camera 115 relative to the FOV of the user. In some embodiments, smart glass 100-1, mobile device 110, server 130, and/or database 152 may further include a communications module 118 enabling the device to wirelessly communicate with remote server 130 via network 150. Smart glass 100-1 may thus download a multimedia online content (e.g., dataset 103-1) from remote server 130, to perform at least partially some of the operations in methods as disclosed herein. In some embodiments, memory 120 may include instructions to cause processor 112 to receive and combine signals from sensors 121, avoid false positives, and better assess user intentions and commands when an input signal is received from a user interface.

In some embodiments, smart watch, or wrist band device 100-2 may include contact and motion sensors that capture a hand gesture of user 101. The hand gesture may be to increase, expand, pan, or shift an FOV of one or more of cameras 115 according to an ROI of user 101. In some embodiments, processor 112 may be configured to identify the hand gestures of the user as provided by any one of the sensors in wearable devices 100, and adjust the FOV of camera 115 accordingly.

Figure 2A:
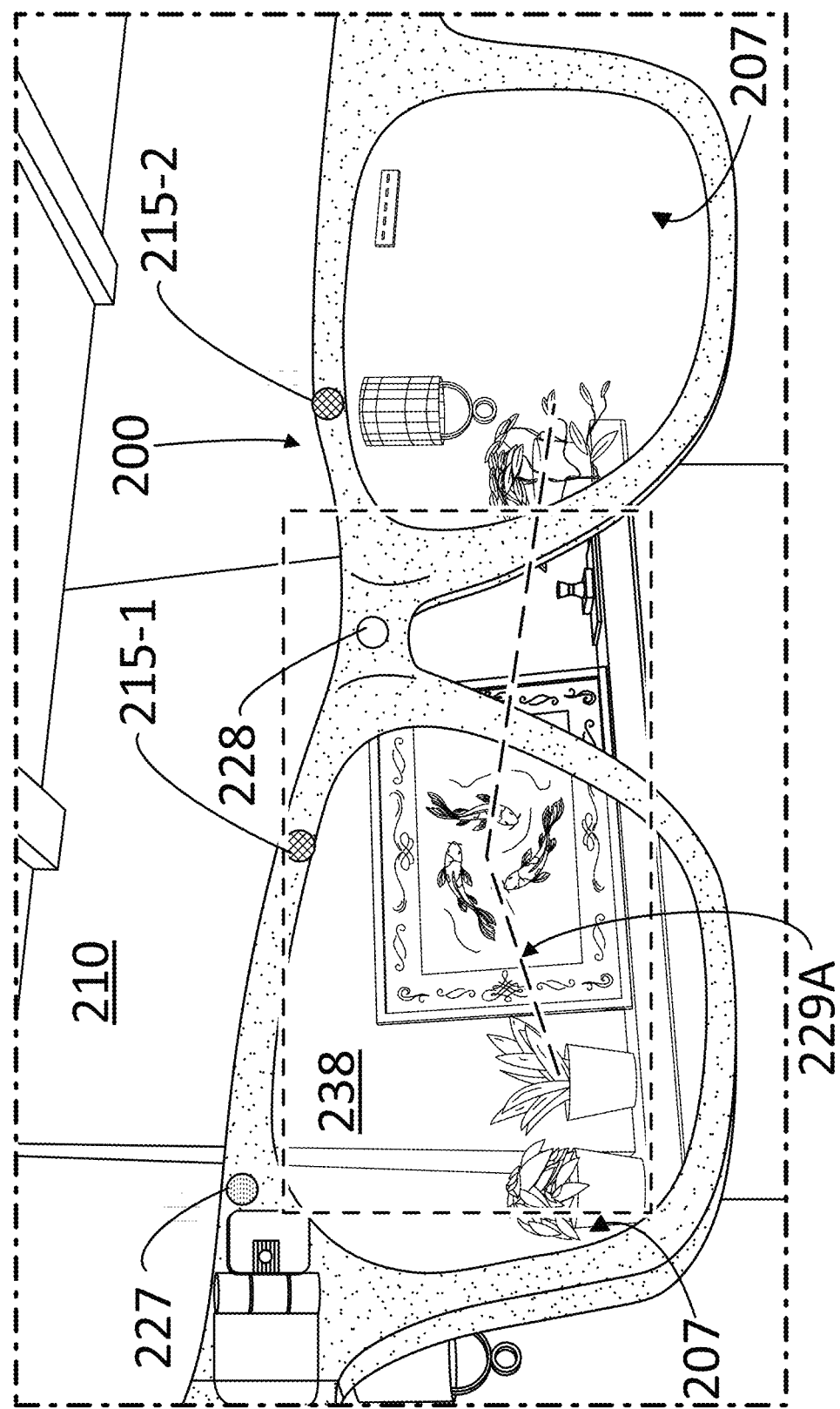
FIGS. 2A-2C illustrate a scene viewed by a user wearing a smart glass, according to some embodiments.
Figure 2B:
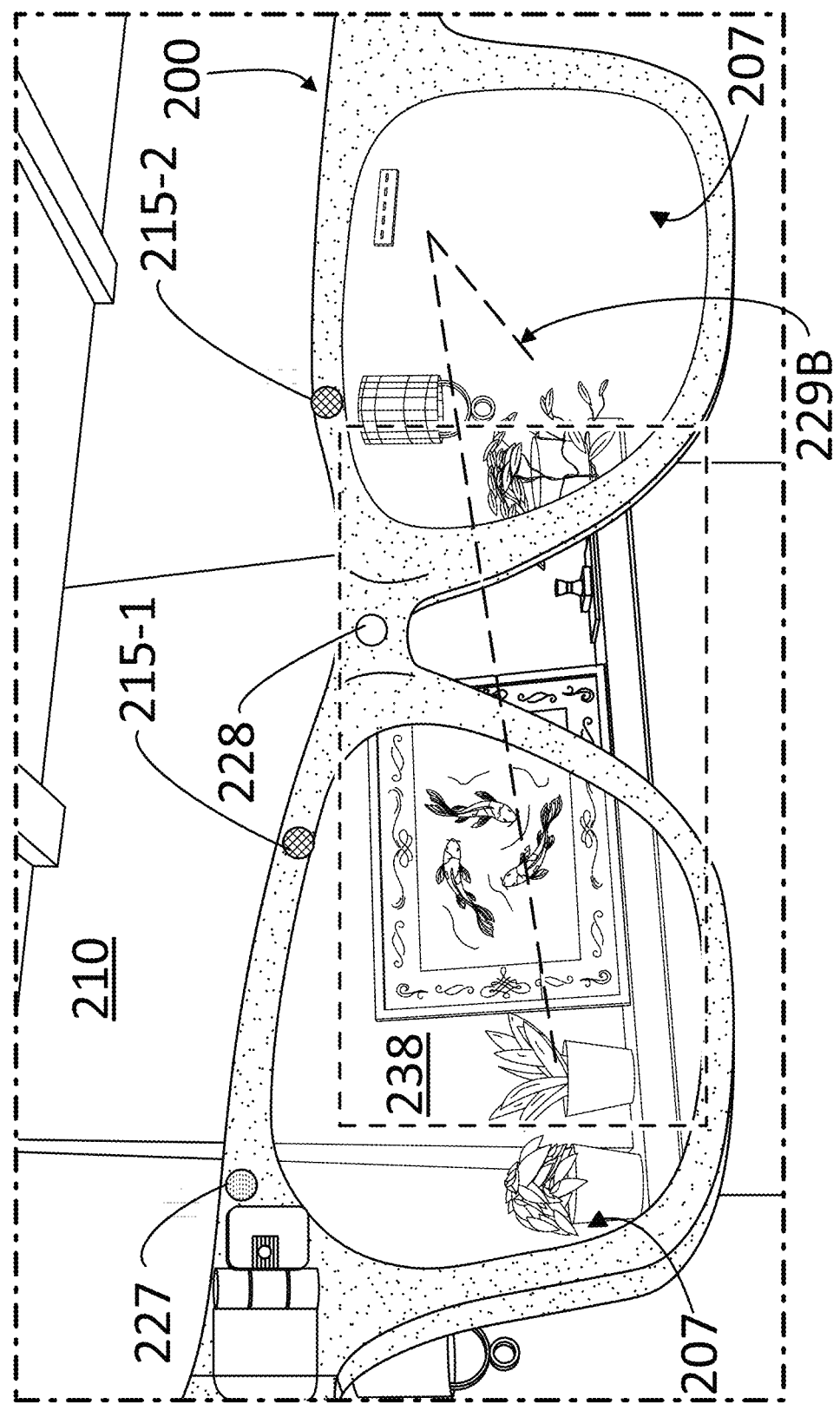
Figure 2C:
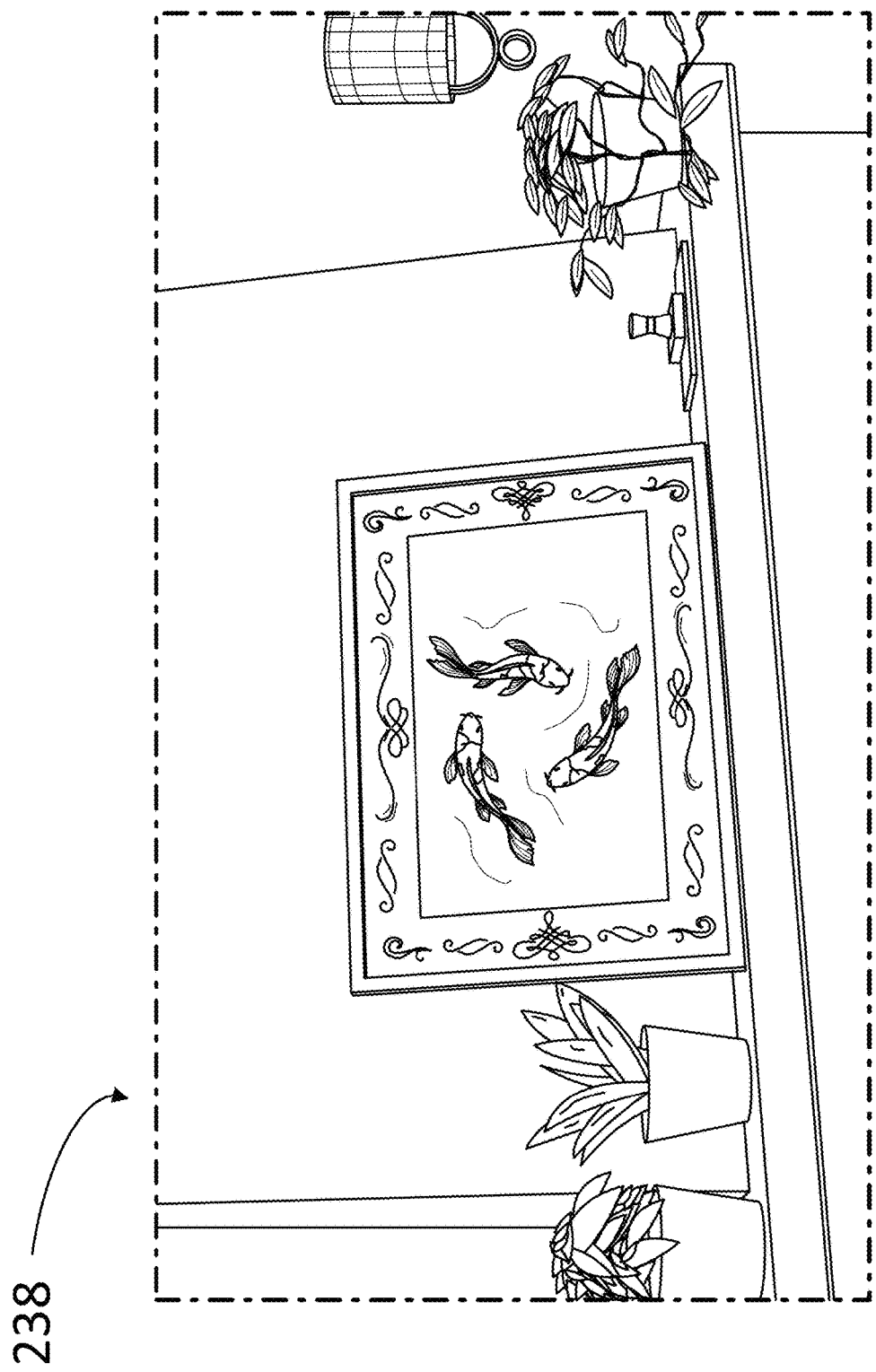

FIGS. 2A-2C illustrate a scene 210 viewed by a user wearing a smart glass 200, according to some embodiments. A user gaze, e.g., gaze vector 229A, may be identified with an eye tracking mechanism 228. For example, the user may be glancing towards the picture frame (e.g., ROI 238). In some embodiments, the center of the ROI 238 is selected as the vergence point of gaze vector 229A. As shown, gaze vector 229A is aligned with the FOV of a first forward-looking camera 215-1 or a second forward-looking camera 215-2 (hereinafter, collectively referred to as "forward looking cameras 215"), shown here with a box with yellow dotted lines, according to some embodiments. In some embodiments, a prior calibration setting stored in a memory may allow the system to estimate a desirable framing to capture an object of interest within ROI 238.

When gaze vector 229B lies outside the FOV of forward-looking camera 215-1, the system could provide feedback to the user indicating that ROI 238 is outside the FOV of one of forward-looking cameras 215. This indication could be provided, for example, using audio cues from a microphone 227 audible to the user of smart glass 200 or haptics on the right side of the spectacles, or some other means. On receiving this feedback, the user may then choose to move their head with eyepieces 207 and forward-looking cameras 215, thereby bringing ROI 238 into the field of view of forward-looking cameras 215. When the eye-gaze and the FOV of at least one of forward-looking cameras 215 overlap, or are concentric, the system may give a "green light" notification to indicate that ROI 238 has been communicated to the capture system.

ROI 238 for a user of a smart glass, is selected according to some embodiments. In some embodiments, the system may capture/trigger still capture, or video capture. In some embodiments, the system may apply optimization techniques to the region of interest (e.g., exposure optimization, camera focus optimization, and the like), or some other module/event that benefits from the region of interest information.

Figure 3:
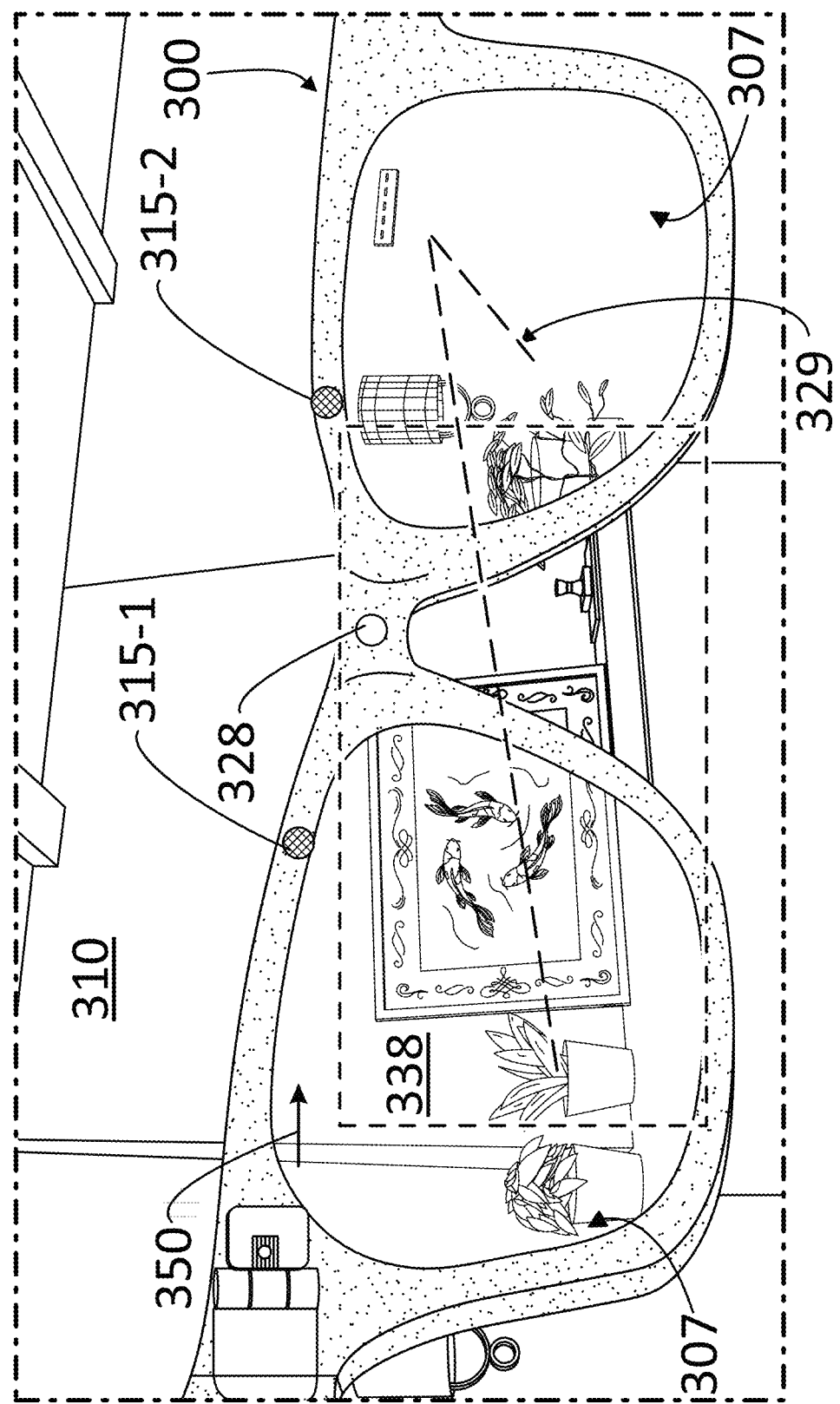
FIG. 3 illustrates a visual indicator in the eyepiece of a smart glass to help the user adjust a camera field of view based on a region of interest for image capture, according to some embodiments.

FIG. 3 illustrates a visual indicator 350 in an eyepiece 307 of a smart glass 300 to help the user adjust an FOV 338 of a first forward-looking camera 315-1 based on a region of interest for image capture, according to some embodiments. The scene 310 may be captured also by a second forward-looking camera 315-2 (hereinafter, first and second forward-looking cameras 315-1 and 315-2 will be referred to, hereinafter, as "cameras 315"). In fact, in some embodiments, the system may identify that gaze vector 329 indicates an object outside of FOV 338. To do this, the system may include an eye tracking sensor 328. Accordingly, the system may either indicate to the user to move their head slightly in a given direction (e.g., to the right and slightly up), or may determine that an FOV of second forward-looking camera 315-2 is better aligned with the ROI of the user. Accordingly, the system may switch second forward-looking camera 315-2 on and first forward-looking camera 315-1 off.

Figure 4:
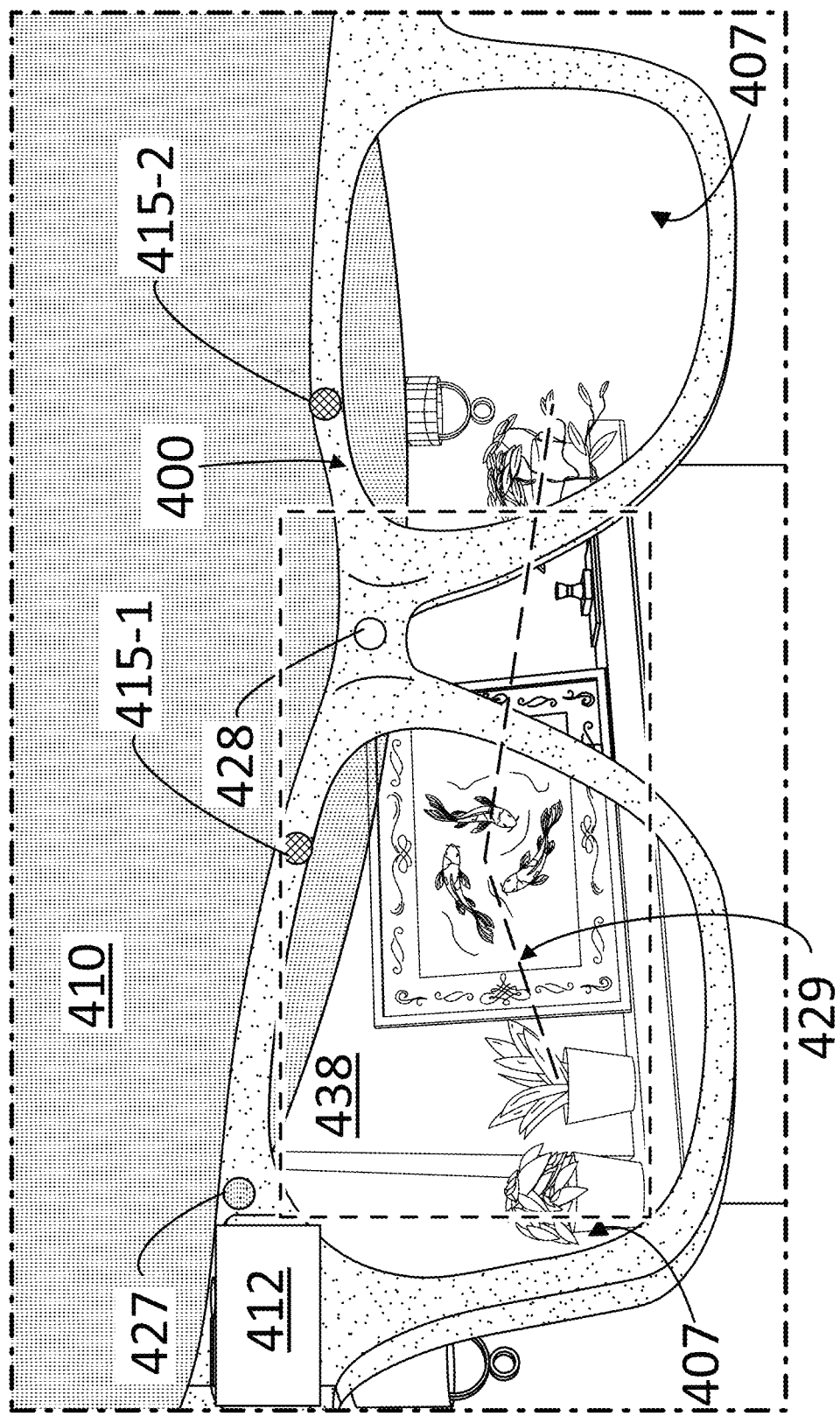
FIG. 4 illustrates forward-looking cameras in a smart glass, and an interference on a field of view of one of the forward-looking cameras, according to some embodiments.

FIG. 4 illustrates forward-looking cameras 415-1 and 415-2 (hereinafter, collectively referred to as "forward-looking cameras 415") in a smart glass 400, and an interference 410 on an FOV 438 of at least one of forward-looking cameras 415, according to some embodiments. Smart glass 400 includes eyepieces 407. For example, interference 410 may be the visor of a cap the user is wearing, which inadvertently gets in the way of FOV 438. In some embodiments, the system may automatically crop interference 410 out of the image and advise the user that auto-crop has been used. Accordingly, in such configuration, a processor 412 may identify the interference and warn the user via a speaker 427 that a cap or "a foreign object" is in the way of FOV 438.

In some embodiments, the user may in fact have collected multiple images with camera 415-1 including interference 410. Accordingly, the images may be uploaded to a mobile device via a wireless data transfer (cf. mobile device 110 and dataset 103-1). An algorithm running on a processor in mobile device 110 may identify interference 410 and provide the voice advisory to smart glass 400 via microphone 427.

In some embodiments, a gaze vector 429 determined using an eye tracking sensor 428 may have selected FOV 438 from first forward-looking camera 415-1. Clearly, eye tracking sensor 428 may not identify or even sense interference 410, which may also block a portion of an FOV of second forward-looking camera 415-2. In response to the communication from speaker 427, the user may adjust the cap, or remove it completely. Once FOV 438 is free from interference 410, the system may issue a clearance notification indicating to the user that a picture can now be taken with either one of forward-looking cameras 415.

Figure 5:
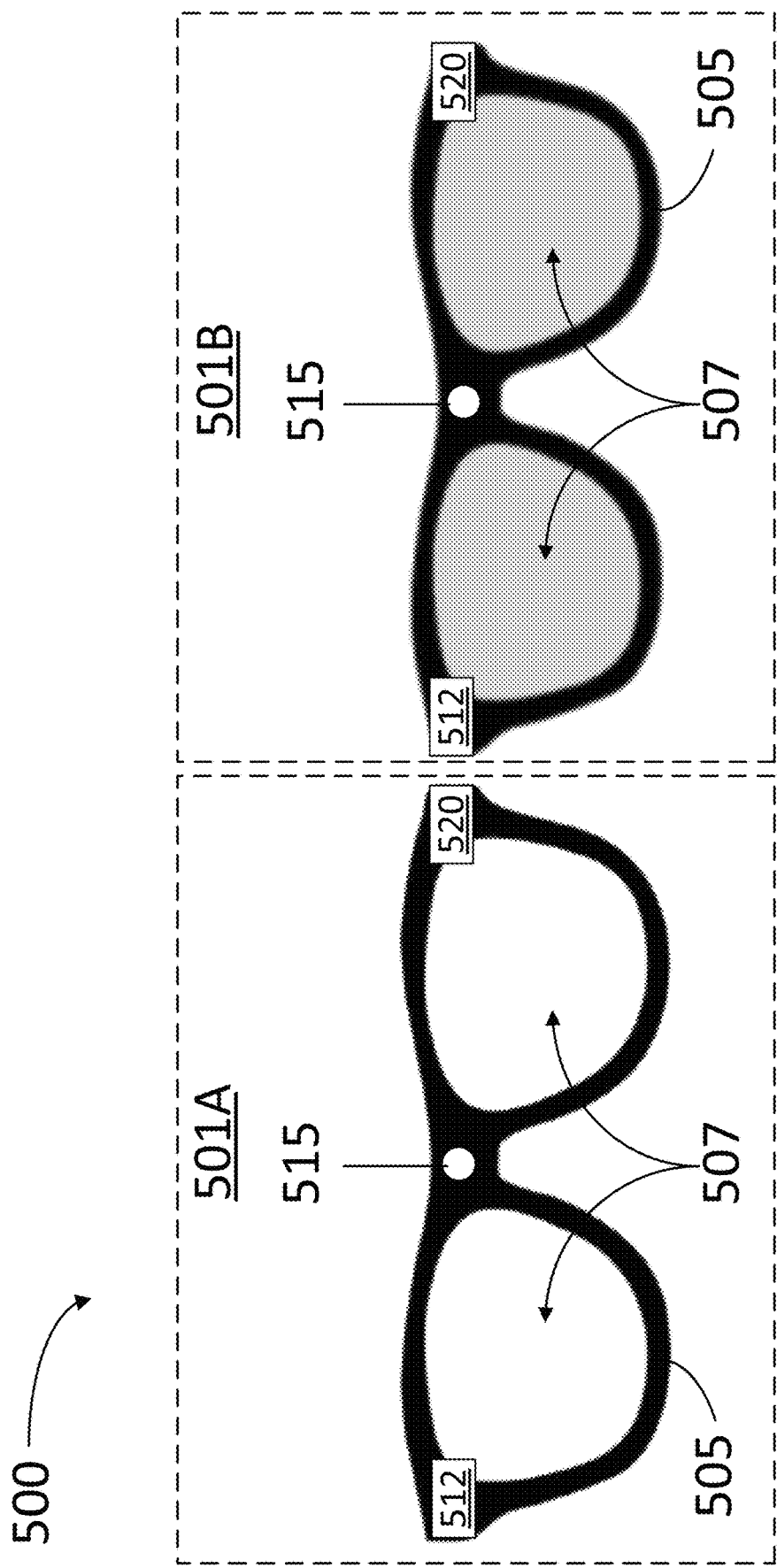
FIG. 5 illustrates a smart glass having a glass shading capability, according to some embodiments.

FIG. 5 illustrates a smart glass 500 having a glass shading capability, according to some embodiments. In some embodiments, active liquid crystals having polarizing components (e.g., linear polarizers, half wave-plates and or quarter wave-plates, and the like) can be switched to be more or less transmissive to light passing through the lens or eyepiece of the glasses. Accordingly, a clear state 501A (high transparency) and a shaded state 501B (low transparency, "sunglass" state) may be provided to eyepieces 507.

Spatially modulating this property across eyepieces 507 can be used to provide feedback to the user as to the relative position of the camera field of view with the forward-image viewed by the user.

In some embodiments, each of eyepieces 507 includes an actuator configured to modify the optical transparency of at least a portion of the eyepiece. Smart glass also includes a camera 515 mounted on frame 505. Camera 515 faces forward towards the user FOV. In some embodiments, smart glass 500 also includes a processor 512 configured to compare an FOV of camera 515 with the forward-image viewed by the user. Processor 512 may be configured to indicate to the user that the FOV of the camera is missing a portion of the forward-image viewed by the user by adjusting the optical transparency of at least a portion of the eyepieces 507. A memory 520 stores instructions which, when executed by processor 512, cause smart glass 500 to perform steps in methods as disclosed herein.

Figure 6A:
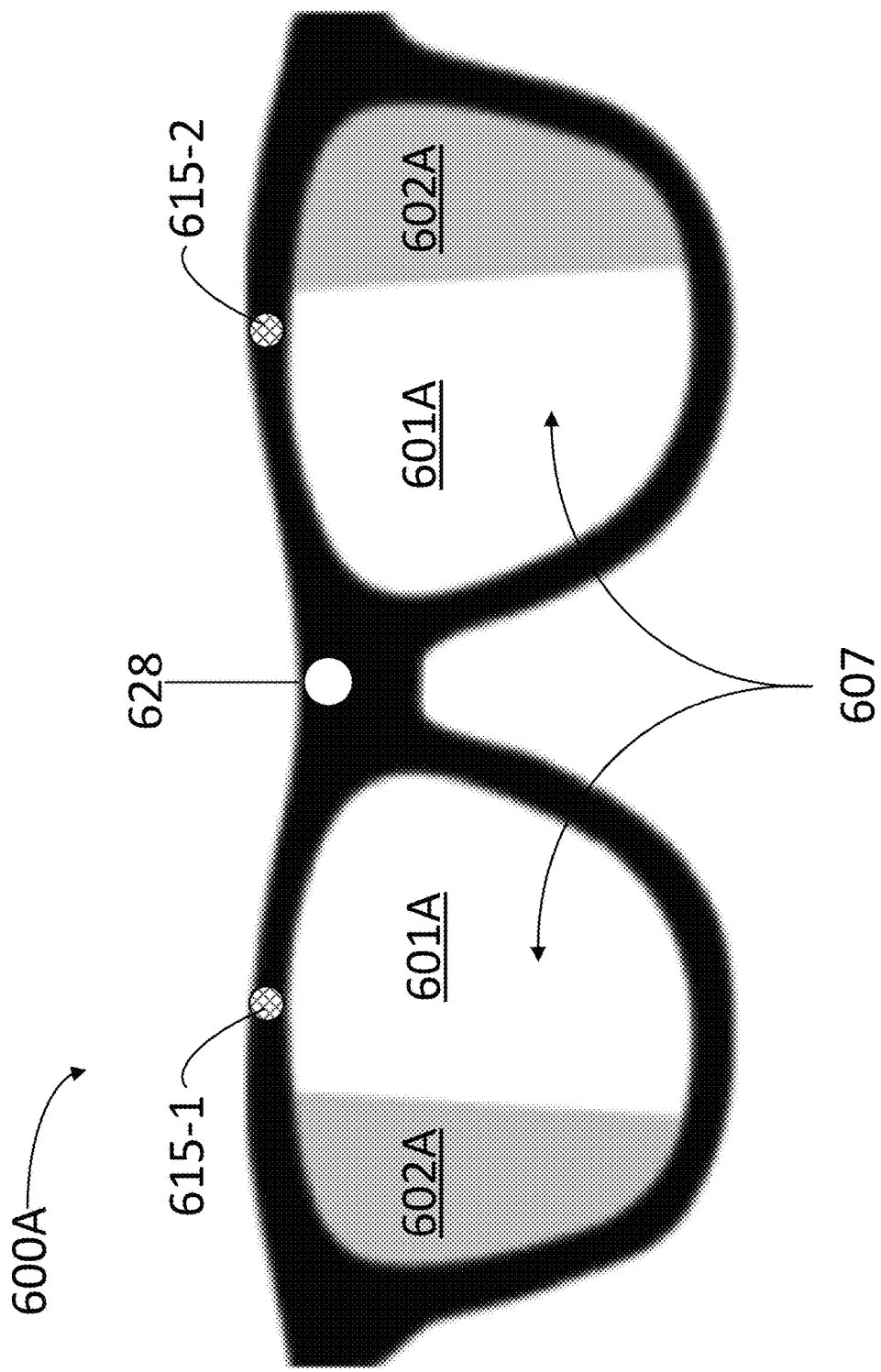
FIGS. 6A-6B illustrate examples of a spatial modulation of the clear state and the shaded state across the eyepieces, according to some embodiments.
Figure 6B:
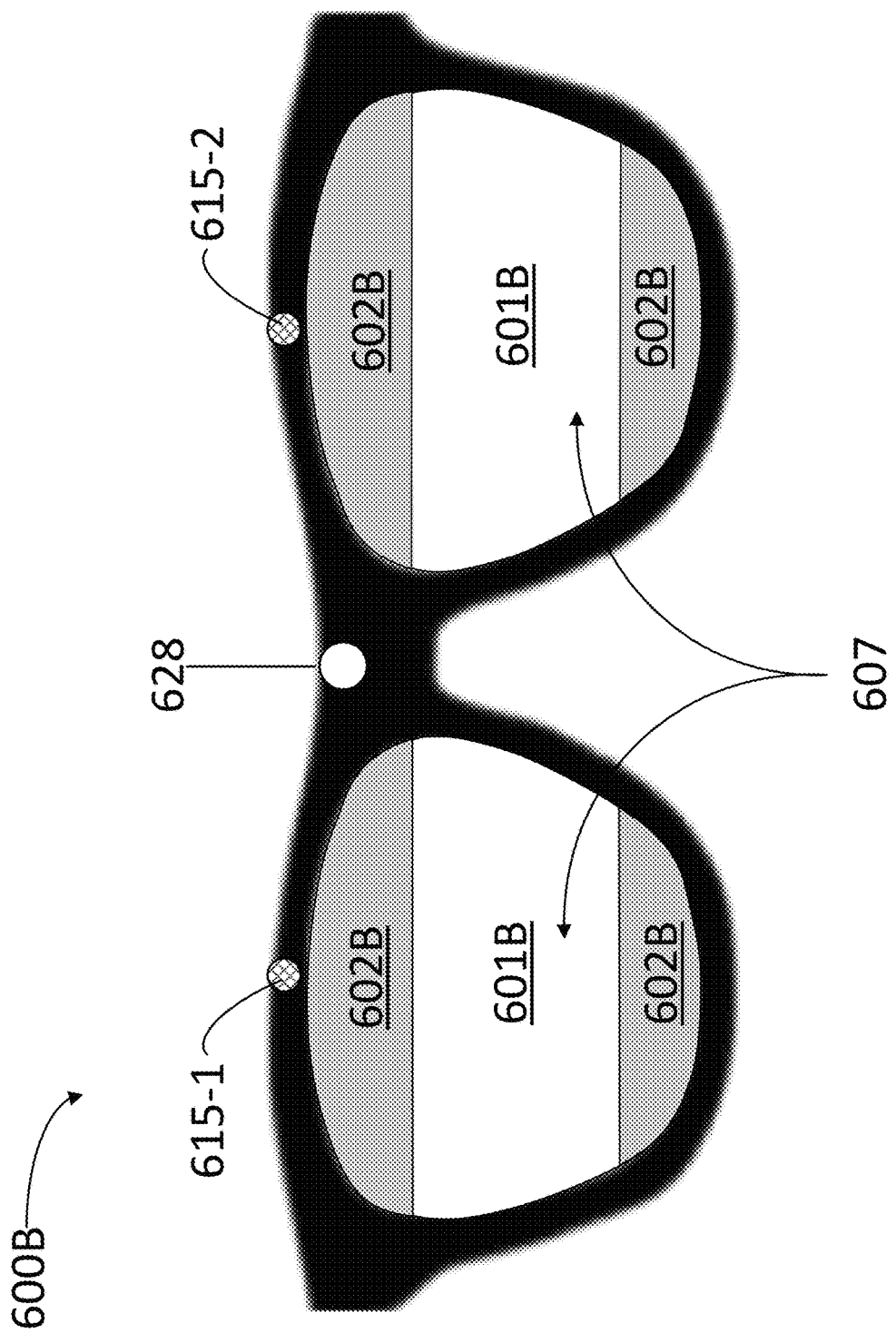

FIGS. 6A-6B illustrate examples of a spatial modulation of a partial vertical clear state 601A and a partial horizontal clear state 601B (hereinafter, collectively referred to as "clear states 601") and a partial vertical shaded state 602A and a partial horizontal clear state 602B (hereinafter, collectively referred to as "shaded states 602") across eyepieces 607, according to some embodiments. Smart glass 600 may include one or two forward-looking cameras 615-1 and 615-2 (hereinafter, collectively referred to as "cameras 615"). Either one of cameras 615, or both, may be active at any point in time, to ensure a better capture of a forward image in view of a user ROI. To leverage power usage by smart glass 600, the system may be configured to keep only one of cameras 615 'on' at any given time. Accordingly, a suitably designed liquid crystal may be configured to switch in a localized manner within each eyepiece 607. In the example shown, vertical sections of eyepieces 607 can be shaded, and made more or less transmissive, to provide feedback to the user. The feedback may be indicative of an FOV of one of cameras 615 that is active. For example, when shading 601A of eyepieces 607 provides a clear vertical stripe in the middle of the forward-image viewed by the user, this may be an indication that the camera FOV is properly centered in the horizontal direction. Likewise, shifting the partial clear state 601A left or right along eyepieces 607 may give a clear indication to the user that the frustum of one of active cameras 615 is misaligned in the horizontal direction and that the head pose might need adjustment prior to collecting an image or video by moving left or right, respectively, or that the use should activate the other one of cameras 615.

In a similar manner, a clear, horizontal stripe 601B across the middle of the user field of view might be an indication that the field of view of one of cameras 615 is properly centered in the vertical direction. Horizontal stripe 601B is delimited above and below by semi-transparent or "shaded" stripes 602B. Likewise, shifting the clear stripe 601B up or down the eyepieces may give a clear indication to the user that the field of view of one of cameras 615 is misaligned in the vertical direction and that the head pose might need adjustment prior to collecting an image or video.

Accordingly, eyepieces 607 with such a localized transmission switching state can be used to provide the user some broad level of feedback as to what is seen by cameras 615 mounted on smart glass 600. In some embodiments, an eye tracking sensor 628 may be used to identify an ROI for the user, in which case shading 601 is adjusted accordingly.

Alternatively, some embodiments may include side and top/bottom bars in photo/video capture mode, the user will automatically understand how the camera is framing, even without partially shading the display in the eyepieces.

Figure 7A:
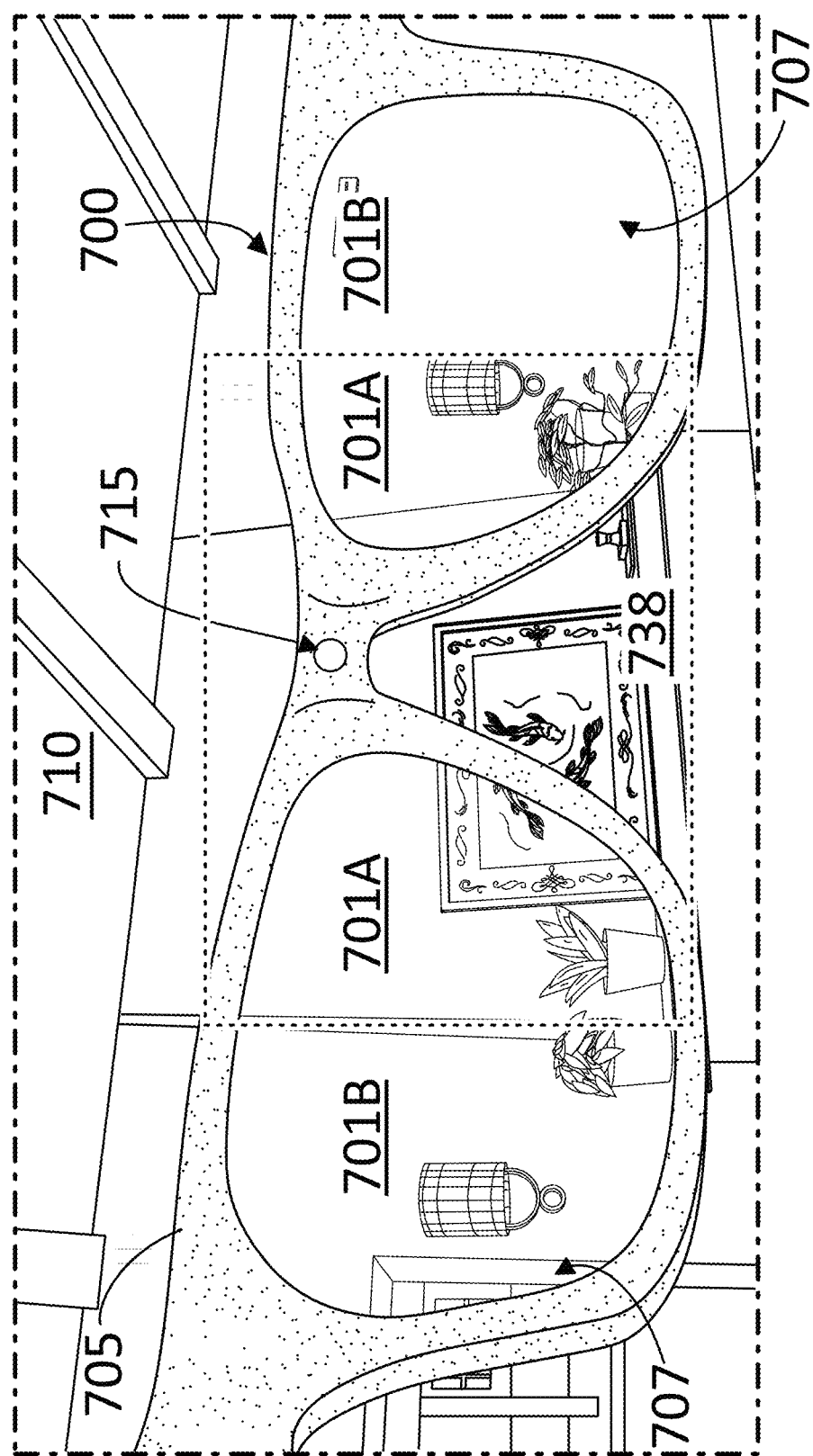
FIGS. 7A-7B illustrate a smart glass with the two eyepieces in a single transmissive state facing a scene, according to some embodiments.
Figure 7B:
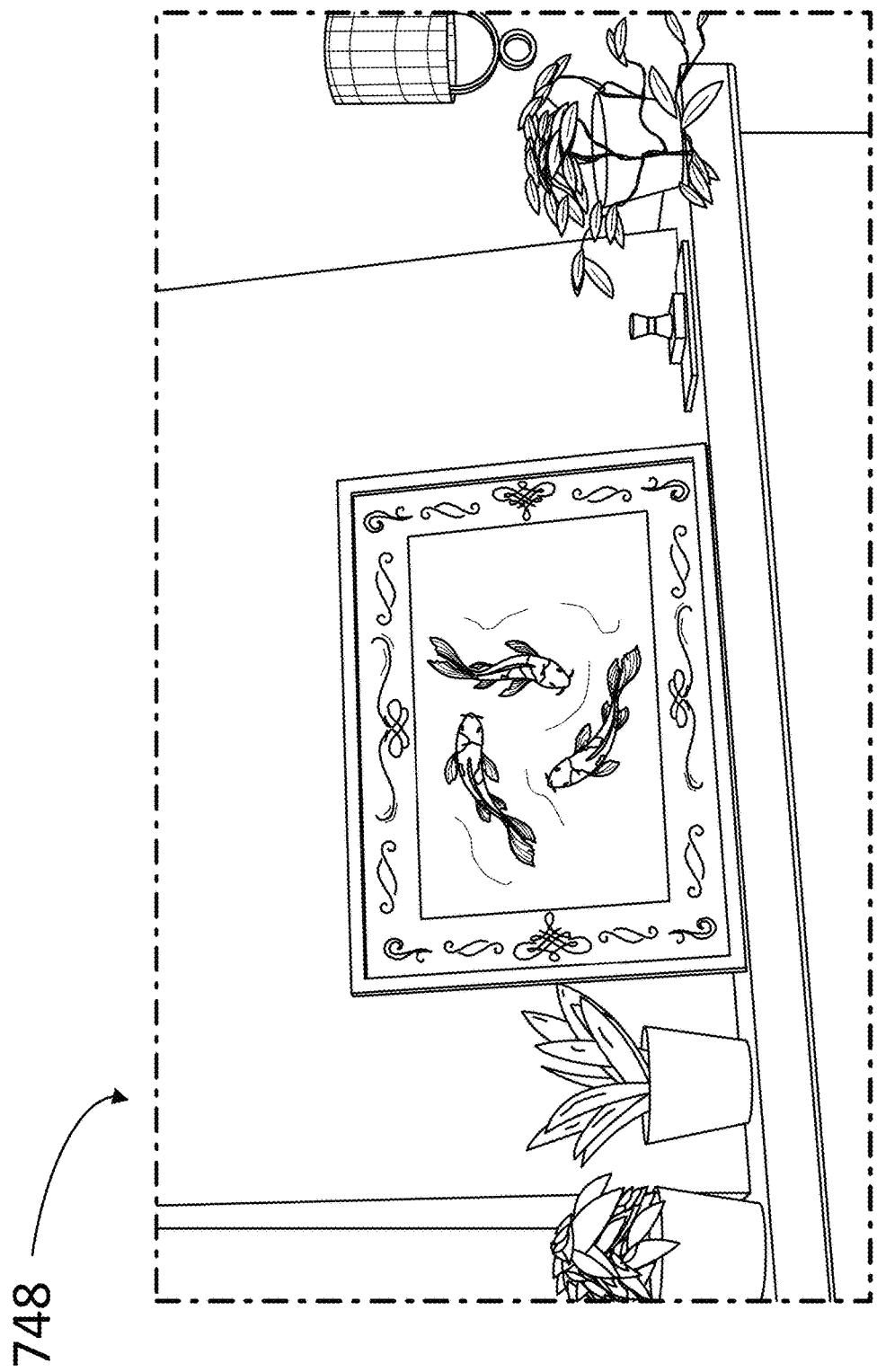

FIGS. 7A-7B illustrate a smart glass 700 with two eyepieces 707 in a single transmissive state facing a scene, according to some embodiments. A field of view 738 of an entire scene 710 viewed by the user of smart glass 700 is captured by a camera 715 that is mounted on a frame 705 of smart glass 700. Accordingly, embodiments as disclosed herein help the user have a sense of the extent of the camera coverage 748 of the scene at the time of capture without the need for a viewfinder/display that shows the camera's perspective, as shown below.

In some embodiments, eyepieces 707 have a localized switchable transmission property, so a (vertical) portion at the outer edges of the eyepieces is in a darker transmission state 701B, according to some embodiments (cf. smart glass 700). And a clearer portion 701A overlaps portion 738 (e.g., the field of view of camera 715). Accordingly, portion 701A will appear in the picture, and portion 701B will be cropped from the camera capture. In some embodiments, the position and size of the portion 701A could be calibrated to the camera's perspective, based on the position and orientation of the camera relative to the eyepieces. Hence, the user could be informed that the portion of the view that is clearly visible will be captured by the camera.

When camera FOV 738 covers the user's ROI, the user may activate the image collection. When camera FOV 738 does not cover the user's ROI, the user may move the head to adjust camera FOV 738. In the case where smart glass 700 includes more than one camera 715, and camera FOV 738 fails to cover the user's ROI, the user may select a different camera to use for image capture, and the system may indicate to the user the size and position of the field of view of the selected camera, prior to collecting an image.

Figure 8:
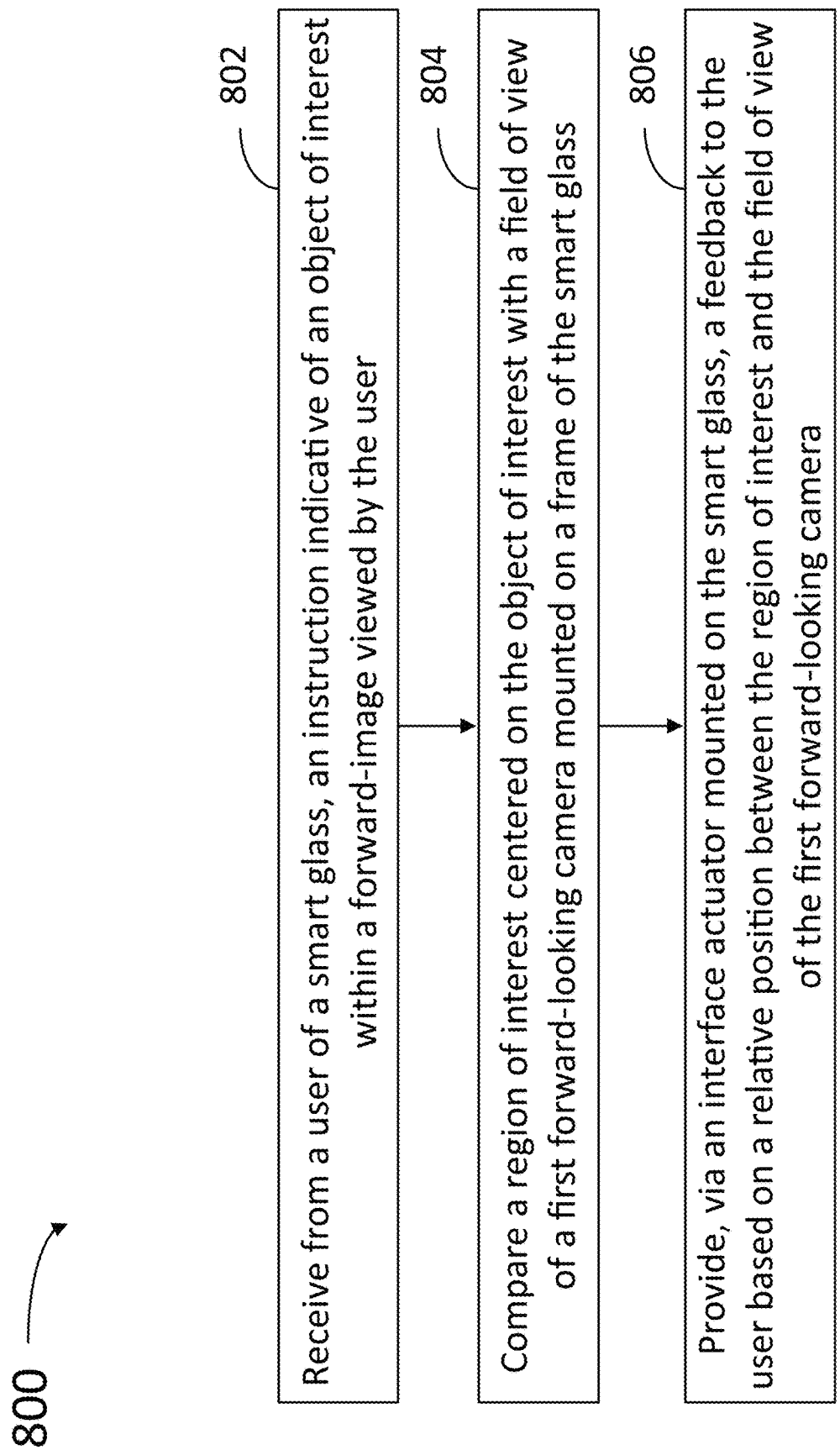
FIG. 8 is a flow chart illustrating steps in a method for matching a region of interest with a field of view of a camera in a smart glass, according to some embodiments.

FIG. 8 is a flow chart illustrating steps in a method 800 for matching a region of interest with a field of view of a camera in a smart glass, according to some embodiments (e.g., smart glasses 100-1, 200, 300, 400, 500, 600, and 700, and cameras 115, 215, 315, 415, 515, 615, and 715). The smart glass may include, in addition to the camera, an eye tracking sensor, a memory storing instructions and a processor configured to execute the instructions to perform at least partially one or more steps in method 800 (e.g., sensing devices 128, 228, 328, and 428, memories 120 and 520, and processors 112 and 512). A method consistent with the present disclosure may include at least one of the steps in method 800, or two or more steps in method 800 performed in a different order, simultaneously, quasi-simultaneously, or overlapping in time.

Step 802 includes receiving, from a user of a smart glass, an instruction indicative of an object of interest within a field of view of the user. In some embodiments, step 802 includes tracking a location of a pupil of the user and identifying the object of interest based on the location of the pupil of the user. In some embodiments, step 802 includes receiving an eye position for a user of a smart glass, the eye position indicative of a position of the object of interest within the field of view of the user. In some embodiments, step 802 includes determining a gaze direction of the user based on a position of two pupils of the user. In some embodiments, step 802 includes receiving a position of two pupils of the user and determining a gaze direction comprises determining a vergence of the position of two pupils of the user. In some embodiments, step 802 may include displaying, in the eyepieces of the smart glass, two converging lines indicative of the gaze direction, converging on the apparent object of interest of the user, illustrating the user what the new crop is for the camera image. In some embodiments, step 802 includes determining the region of interest having an area of the field of view of the first forward-looking camera centered on the object of interest. In some embodiments, the smart glass includes a second forward-looking camera, and step 802 further includes receiving, from the user, an instruction to turn the second forward-looking camera on when the region of interest is misaligned with the field of view of the first forward-looking camera.

Step 804 includes comparing a region of interest centered on the object of interest with a field of view of a first forward-looking camera mounted on a frame of the smart glass.

Step 806 includes providing, via an interface actuator mounted on the smart glass device, a feedback to the user based on a relative position between the region of interest and the field of view of the first forward-looking camera. In some embodiments, the smart glass includes a second forward-looking camera, and step 806 includes determining a relative position of the region of interest and a field of view of the second forward-looking camera. In some embodiments, the smart glass includes a speaker, and step 806 includes providing an instruction to the user to move the smart glass in a given direction. In some embodiments, the smart glass includes a light emitter, and step 806 includes indicating a direction to move a gaze of the user with the light emitter.

Hardware Overview

Figure 9:
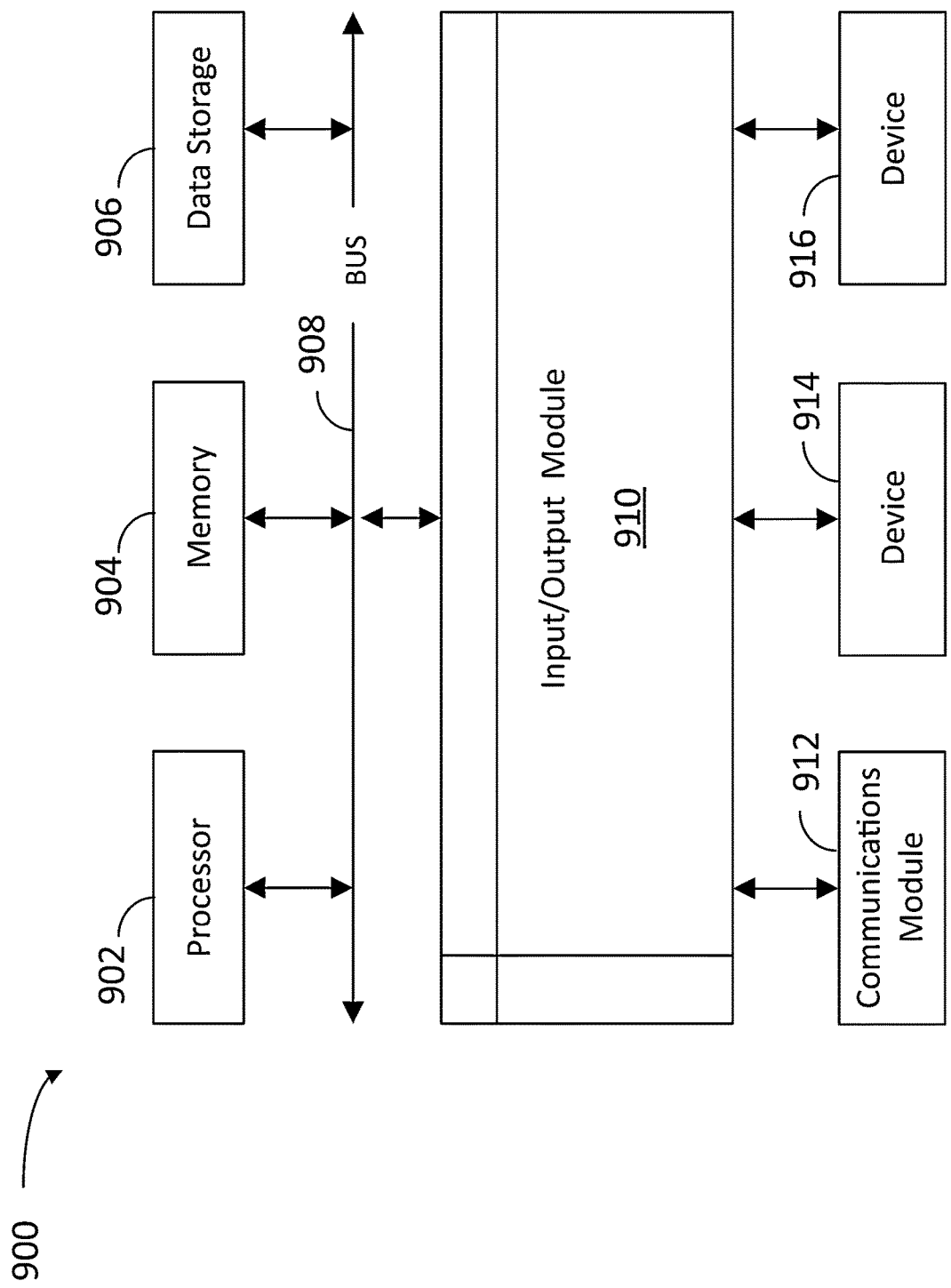
FIG. 9 is a block diagram illustrating an exemplary computer system with which a headset and methods for use of the same can be implemented, according to some embodiments.

FIG. 9 is a block diagram illustrating an exemplary computer system 900 with which headset 100 of FIG. 1, and method 800 can be implemented, according to some embodiments. In certain aspects, computer system 900 may be implemented using hardware or a combination of software and hardware, either in a dedicated server, or integrated into another entity, or distributed across multiple entities. Computer system 900 may include a desktop computer, a laptop computer, a tablet, a phablet, a smartphone, a feature phone, a server computer, or otherwise. A server computer may be located remotely in a data center or be stored locally.

Computer system 900 includes a bus 908 or other communication mechanism for communicating information, and a processor 902 (e.g., processor 112) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled with bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, input/output module 910 is configured to connect to a plurality of devices, such as an input device 914 and/or an output device 916. Exemplary input devices 914 include a keyboard and a pointing device, e.g., a mouse or a trackball, by which a consumer can provide input to the computer system 900. Other kinds of input devices 914 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 916 include display devices, such as an LCD (liquid crystal display) monitor, for displaying information to the consumer.

According to one aspect of the present disclosure, wearable devices 100 can be implemented, at least partially, using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device, comprising:
    a frame including an eyepiece to provide a forward-image to a user;
    a first forward-looking camera mounted on the frame;
    a processor configured to identify a region of interest within the forward-image; and
    an interface device to indicate the user that a first field of view of the first forward-looking camera is misaligned with the region of interest;
    a second forward-looking camera mounted on the frame, wherein the second forward-looking camera is configured to switch on and the first forward-looking camera is configured switch off when the region of interest is better aligned with a second field of view of the second forward-looking camera.

2. The device of claim 1, further comprising a sensing device facing the user for tracking a pupil position of the user, wherein the processor identifies the region of interest based on the pupil position of the user.

3. The device of claim 1, wherein the processor identifies the region of interest based on a gaze direction of the user within a field of view of the user.

4. The device of claim 1, further comprising a memory storing instructions which, when executed by the processor, cause the device to find a gazing vector indicative of a center of the region of interest within a field of view of the user.

5. The device of claim 1, wherein the interface device includes an audio device to provide a signal for the user to adjust a head pose and align the first field of view of the first forward-looking camera with the region of interest.

6. The device of claim 1, wherein the interface device comprises a vibrating component configured to indicate the user to nudge a head position in a desired direction to align the first field of view of the first forward-looking camera with the region of interest.

7. The device of claim 1, wherein the eyepiece includes a liquid crystal configured to obscure a vertical portion of the eyepiece, or a horizontal portion of the eyepiece, when activated, to induce the user to move a head position horizontally or vertically, respectively, to center the first field of view of the first forward-looking camera with the region of interest.

8. The device of claim 1, further comprising an actuator configured to modify a color of a portion of a field of view of the eyepiece corresponding to the region of interest.

9. The device of claim 1, further comprising a microphone to receive a voice command from the user identifying an object of interest within a field of view of the user.

10. The device of claim 1, further comprising wherein the interface device is configured to provide the user an option to activate the second forward-looking camera when the first field of view of the first forward-looking camera is misaligned with the region of interest.

11. A computer-implemented method, comprising:
    receiving from a user of a smart glass, an indication of an object of interest within a forward-image viewed by the user;

comparing a region of interest centered on the object of interest with a first field of view of a first forward-looking camera mounted on a frame of the smart glass;

activating a second forward-looking camera mounted on the frame of the smart glass when the region of interest is better aligned with a second field of view of the second forward-looking camera, wherein the first forward-looking camera is switched off when the second forward-looking camera is activated; and providing, via an interface actuator mounted on the smart glass, a feedback to the user based on a relative position between the region of interest and the first field of view of the first forward-looking camera.

12. The computer-implemented method of claim 11, wherein receiving the indication of the object of interest within a field of view of the user includes tracking a location of a pupil of the user and identifying the object of interest based on the location of the pupil of the user.

13. The computer-implemented method of claim 11, wherein receiving the indication of the object of interest within a field of view of the user includes receiving an eye position for the user of the smart glass, the eye position indicative of a position of the object of interest within the field of view of the user.

14. The computer-implemented method of claim 11, wherein receiving the indication of the object of interest within a field of view of the user includes determining a gaze direction of the user based on a position of two pupils of the user.

15. The computer-implemented method of claim 11, wherein receiving the indication of the object of interest within a field of view of the user includes receiving a position of two pupils of the user, and determining a gaze direction comprises determining a vergence of the position of the two pupils of the user.

16. The computer-implemented method of claim 11, further comprising determining the region of interest having an area of the first field of view of the first forward-looking camera centered on the object of interest.

17. The computer-implemented method of claim 11, further comprising receiving, from the user, and instruction to turn the second forward-looking camera on when the region of interest is misaligned with the first field of view of the first forward-looking camera.

18. The computer-implemented method of claim 11, wherein providing the feedback to the user comprises determining a relative position of the region of interest and the second field of view of the second forward-looking camera.

19. The computer-implemented method of claim 11, wherein the smart glass includes a speaker, and providing the feedback to the user comprises providing an instruction to the user to move the smart glass in a given direction or adjust a head position of the user relative to the object of interest.

20. The computer-implemented method of claim 11, wherein the smart glass includes a light emitter, and providing the feedback to the user comprises indicating a direction to move a gaze of the user with the light emitter.

* * * * *